March 28, 1950  D. CLEGG  2,501,662
AIRCRAFT TURRET

Filed March 30, 1944  2 Sheets-Sheet 1

INVENTOR
DOUGLAS CLEGG
BY
ATTORNEY

March 28, 1950　　　　D. CLEGG　　　　2,501,662
AIRCRAFT TURRET
Filed March 30, 1944　　　　　　　　2 Sheets-Sheet 2
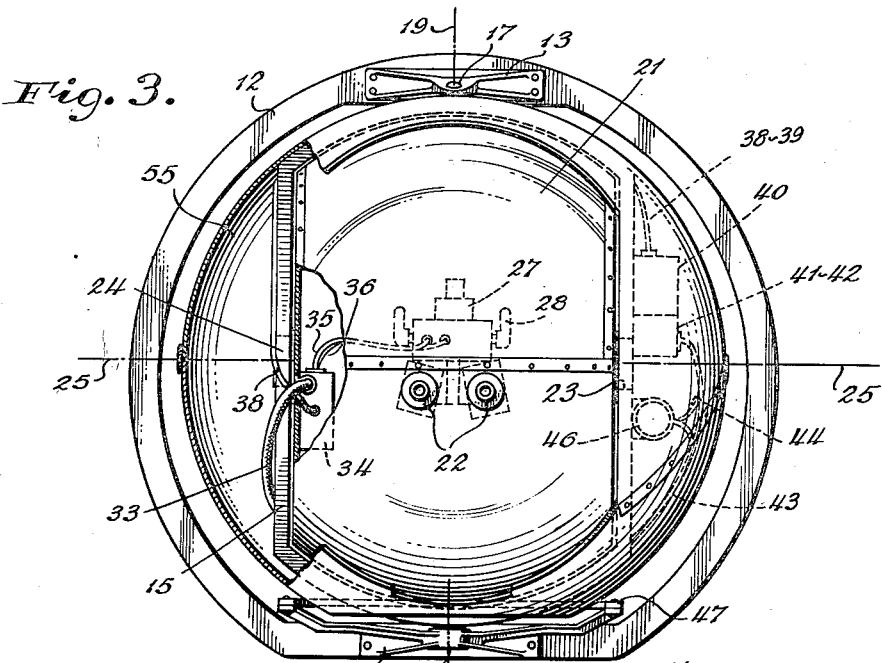
INVENTOR
DOUGLAS CLEGG
BY
his ATTORNEY Patented Mar. 28, 1950

2,501,662

UNITED STATES PATENT OFFICE 2,501,662

AIRCRAFT TURRET

Douglas Clegg, Great Neck, N. Y., assignor to The Sperry Corporation, a corporation of Delaware Application March 30, 1944, Serial No. 528,664

6 Claims. (Cl. 89—37.5)

This invention relates, generally, to streamlined turrets particularly adapted for mounting in the nose or tail of an aircraft.

A feature of the invention is the provision of a turret suitable for mounting in the nose or tail of an airplane, the turret being supported for rotation about two axes and suitably streamlined to the skin of the airplane to provide a structure having substantially uniform aerodynamic characteristics irrespective of the angular position of the turret.

Another feature of the invention is the provision of a structure for supporting a turret in an opening at either end of an airplane fuselage. A turret thus located should be rotatable about vertical and horizontal axes extending across the turret opening in the fuselage. This arrangement of axes creates a difficult streamlining problem, since the turret must be spaced appreciably from the surrounding fuselage to provide room for the apparatus which supports the turret for rotation about its axes. The convenient ring and track arrangement often used for upper and lower turrets cannot be used because the axis for such track extends into the turret opening in the fuselage rather than across it.

In a preferred embodiment, the turret mounting of the invention includes a frame pivotally supported for rotation about a vertical axis by suitable means disposed within the fuselage adjacent the turret opening. A spherical turret having flattened or truncated sides is pivotally supported by the frame for rotation about a horizontal axis. A curved shell secured to the frame and closely fitting the turret opening in the fuselage streamlines the turret to the fuselage of the airplane. The curved shell encloses the flattened sides of the turret, as well as the turret supports and the driving mechanism therefor, and also a small area of the upper and lower surfaces of the turret immediately adjacent the fuselage; the portions of the turret and streamlining shell projecting from the fuselage, having jointly a very nearly spherical surface which does not vary appreciably with different angular positions of the turret. When the turret turns about its vertical or azimuth axis, the frame and streamlining shell turn therewith. When the turret turns about its horizontal or elevation axis, the frame and streamlining shell remain fixed. Some turrets heretofore used in aircraft have been adjustable about only one axis and the guns moved independently of the turret about a second axis. With this arrangement it is necessary to provide openings of some description to permit the guns to move relative to the turret. This arrangement simplifies turret construction, since rotation of the turret about a single axis does not change the portion of the turret which is exposed to the air stream.

Some ball turrets have been developed that are rotatable about two independent axes. These turrets are usually arranged above or below the fuselage of the plane with one axis of rotation, usually the vertical axis, projecting through the opening in the fuselage so rotation of the turret about that axis does not change the exposed surface of the turret. Rotation of the turret about an axis normal to the aforementioned axis, usually the elevation axis, changes the exposed portion of the turret. Since the exposed portion of the turret is changed during rotation about only one axis, it is possible to make the turret symmetrical about that axis without being concerned about its symmetry about the other axis of rotation.

When a turret is mounted in the nose or tail of an aircraft for rotation in both azimuth and elevation, both axes of rotation extend across the opening in the skin of the aircraft. With this arrangement, the exposed portion of the turret shell is changed by movements in azimuth as well as by movements in elevation. It becomes necessary to provide an adequate support for the turret and at the same time to enclose all portions of the mounting and control systems which may at any time be exposed to the air stream by rotation of the turret about either the azimuth or elevation axes. With the turret arranged in this position a much larger portion of the turret becomes exposed, assuming that guns carried by the turret are arranged to cover or scan a substantially hemispherical portion of the space.

In order to provide uniform aerodynamic characteristics of the nose and tail portions of the fuselage it is important that the turret provide a continuous air flow surface with the skin line or external surface of the plane for all turret positions. For this reason, it is desirable to maintain a substantially uniform or aligned surface between the turret and the skin line of the aircraft during movement of the turret.

It is a major object of the invention to provide an aircraft turret which is rotatable about two independent axes and which forms a substantially uniform and aligned airflow surface with that of the fuselage of the aircraft.

Another object of the invention is to provide an aircraft turret mounted to project outwardly from the skin line of the aircraft and rotatable in azimuth and elevation without materially affecting the aerodynamic characteristics of the fuselage.

A further object of the invention is to provide an aircraft turret supported for rotation about azimuth and elevation axes with an enclosure or outer shell movable with the turret about one of said axes to maintain a continuous and aligned airflow surface between the turret and skin line of the aircraft.

A still further object of the invention is to improve the aerodynamic characteristics of a turret mounted for rotation about independent axes by offsetting these axes transversely of each other.

Other objects and advantages of the invention will become apparent from the following specification taken in connection with the accompanying drawings wherein Fig. 1 is a top plan view of an aircraft turret embodied in the invention with some parts in section and portions broken away for purposes of clearness;

Fig. 3 is a front elevation of the turret shown in Fig. 1 with portions broken away for purposes of clearness;

Fig. 4 is a section taken of the turret shown in Fig. 2, taken on a line 4—4 of that figure.

According to the invention in its preferred form, a frame carries bearings for mounting a turret in the tail or nose of an aircraft for rotation in azimuth about a normally vertical axis. A turret shell or a shell-like enclosure, is supported by trunnions in this frame to rotate about an elevation axis. The surface of the enclosure is symmetrical about the elevation axis so rotation about that axis permits the maintenance of uniform aerodynamic characteristics in all positions.

Suitable motors are provided for rotating the enclosure in the frame about the elevation axis, and for rotating the enclosures together with the frame about the azimuth axis. The frame, together with the power controls as well as the trunnions supporting one enclosure, are enclosed in a second spherical enclosure that is carried by the frame for rotation therewith in azimuth. One enclosure forms an outer shell, symmetrical about the azimuth axis and surrounding a large portion of the other enclosure, that provides a substantially continuous airflow surface between the skin of the plane and the surface of the other enclosure.

It is necessary that one enclosure be smaller than the other in order to provide room for the trunnions and the power mechanisms for driving the turret in azimuth and elevation. In order to reduce the size of the opening between these enclosures, the elevation axis is offset transversely of the azimuth axis in the direction of the opening. This provides an offset arrangement of the centers of the ball-like enclosures, but maintains a uniformly small opening between them. One enclosure fits into the other in a segmental manner at the opening mentioned. Thus, when assembled, the turret comprises a first spherical enclosure and a second spherical enclosure surrounding a portion of the first enclosure.

Figure 1:
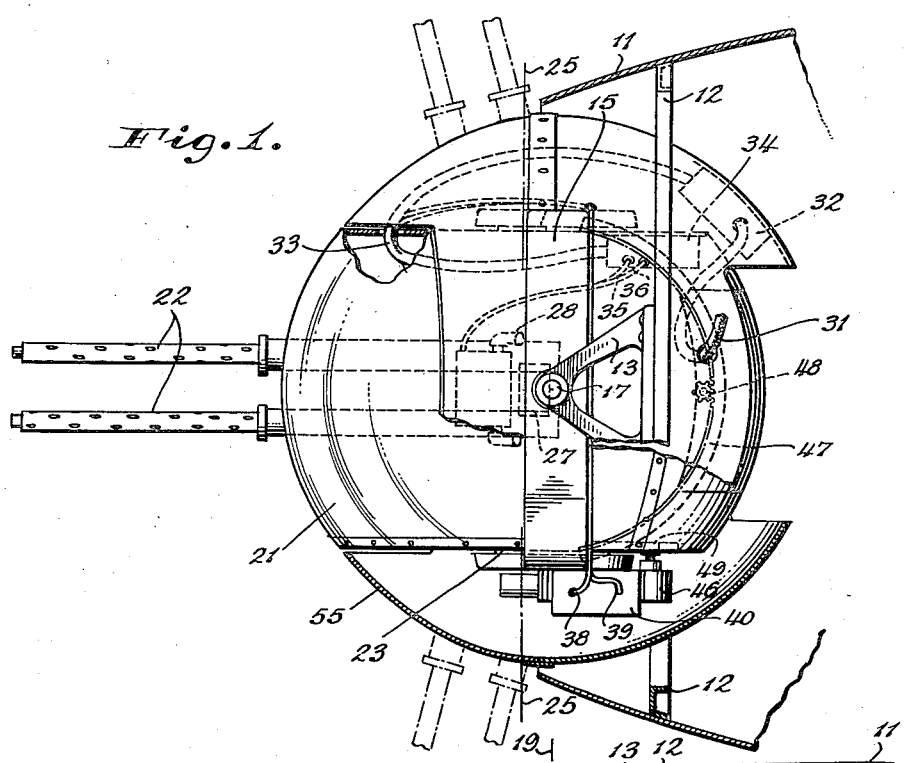
Figure 2:
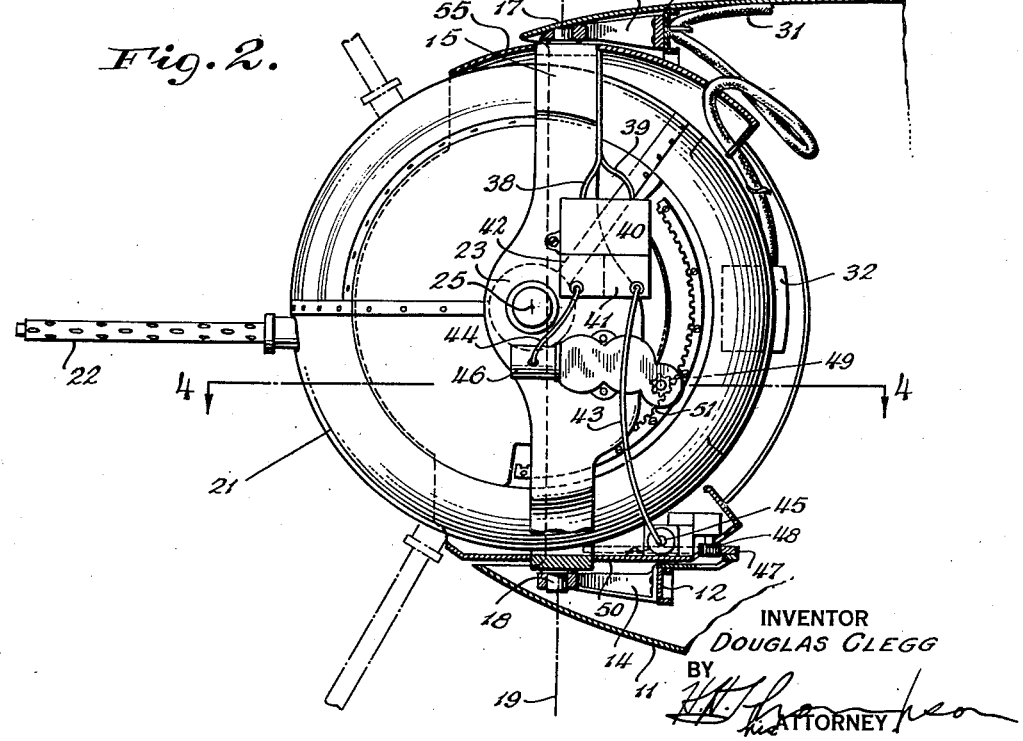
Fig. 2 is a side elevation of the turret shown in Fig. 1 with some portions in section.

The fuselage or skin of an aircraft is designated in Fig. 1 by the numeral 11, and carries an annular reinforcing member 12 on which are mounted a pair of brackets 13 and 14 (Fig. 2) at the upper and lower portions thereof. A frame 15 in the form of a yoke is carried in the brackets 13 and 14 by bearings 17 and 18 for rotation in azimuth about a vertical axis 19. A spherical enclosure 21 carrying guns 22, 22 is supported by trunnions 23 and 24 for rotation in elevation about horizontal axis 25. The enclosure 21 has the shape of a surface of revolution symmetrical about the elevation axis 25 for reasons which will subsequently become apparent.

A sight 27 is carried within the turret which may be of such size to contain a gunner who by operation of hand controls 28 may control the movement of the turret in azimuth and elevation.

Power is supplied through cable 31 to a junction box 32, mounted externally of the turret shell, which is connected by a cable 33 to a switch box 34 within the enclosure 21. Operation of the controls 28 by movement about vertical and horizontal axes supplies signals through cables 35 and 36, the switch box 34 and by way of cables 38 and 39 to an amplifier 40 which controls the stroke rods of a pair of hydraulic variable displacement pumps 41 and 42. Displacement of the stroke rods depends upon the movement of the hand control 28 and changes pressure supplied through conduits 43 and 44 to azimuth and elevation hydraulic motors 45 and 46, respectively, which drive the turret in azimuth and/or elevation according to the position of the hand control 28.

The azimuth hydraulic motor 45 drives pinion 48 which engages a relatively stationary sector gear 47 that is mounted on the support 12. Since the hydraulic motor is carried by a bracket 50 on the frame 15 rotation of the pinion 48 causes the frame to turn in azimuth. The direction of turning in azimuth depends upon the direction of the movement of hand control 28. The elevation hydraulic motor 46 is also carried by the frame 15 and drives pinion 48 that meshes with gear sector 51 on the enclosure 21 to rotate the enclosure about the elevation axis 25 in a direction dependent upon the handle control 28.

In order to provide uniform aerodynamic characteristics for all positions of the turret, fairing 55 (also an enclosure) is carried by the frame 15 to enclose the frame, the spherical enclosure 21 as well as the hydraulic driving systems including pumps 41 and 42 and motors 45 and 46. This fairing forms an outer shell covering the major portion of the inner turret shell, and enclosure 21 and is shaped so all portions which may become exposed to the air stream during rotation of the frame in azimuth are more or less symmetrical about the azimuth axis 19. As shown by the dotted line positions of the guns in Figs. 1 and 2 the turret may be rotated in azimuth and elevation to cover a large portion of space which is almost a complete hemisphere.

As the turret moves in azimuth the portion of the fairing, which is normally contained within the fuselage, becomes exposed to the air stream. Hence, for various positions of the guns a major portion of the entire surface of the outer shell is exposed at one time or another to the air stream. Similarly, the turret or inner shell likewise has a large percentage of its surface exposed at various times to the air stream. The small area which does not become exposed is not necessarily symmetrical since it will not affect the size of the openings between the shells or between the outer shell and the skin line of the plane.

The inner shell is smaller than the outer shell, since it is contained within the frame 15 and must permit room for the azimuth driving motor 45. For this reason arrangement of the turret shells in the usual manner for rotation about mutually perpendicular azimuth and elevation axes would produce a rather large opening between the two shells. To reduce the size of this opening between the two shells, the elevation axis of the turret shell has been moved toward the opening in the fairing, that is, it has been moved transversely, away from the azimuth axis in a manner which tends to close the opening between the two shells by the segmental or partial contact of the inner shell with the other shell. This offset of the axes has other advantages in that it provides more room for items necessarily carried between the two shells such as the azimuth motor 45 and the frame 15', even permitting the use of a slightly larger turret shell.

When an operator within the turret moves the handle control 28 to actuate azimuth motor 45, the frame is turned in azimuth about vertical axis 19. The fairing 55, forming an outer shell surrounding a major portion of the enclosure 21 to cover the trunnions, driving motors, etc., is turned with the frame and has a shape which provides a continuous air flow surface between the enclosure 21 and the fuselage 11 for all azimuth positions of the guns 22.

Movement of the hand control 28 to operate the elevation motor 46 causes the enclosure 21 carrying guns 22 to move about the horizontal axis 25. This inner shell preferably has a symmetrical shape about the elevation axis 25 so it does not alter the aerodynamic characteristics or drag of the aircraft for any position of the guns.

In order to provide and maintain the airflow surface between the fairing or outer shell and the turret shell, the elevation axis 25 is offset transversely of the horizontal axis 19 in the direction of the opening in the fairing through which the turret shell projects. Since the elevation and azimuth axes are normally perpendicular, the transverse offset of these axes places each of them in a plane that is perpendicular to the other, i. e., the elevation axis is contained in a plane that is perpendicular to the azimuth axis, and the azimuth axis is likewise contained in a plane that is perpendicular to the elevation axis.

From the foregoing description it will be apparent that the inner or turret shell is rotatable about both azimuth and elevation axes, whereas the fairing forms an outer shell, enclosing the elevation trunnions and all external mechanisms, that rotates with the turret shell in azimuth only to form a continuous air flow surface between the shell of the turret and the skin of the aircraft for all positions of the guns.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A turret comprising a first curved shell rotatable about a first axis and having an opening therein, a power mechanism for rotating said first shell, a second curved shell carried within said first shell and additionally rotatable about a second axis normal to said first axis, said second shell presenting a continuous closure for the opening in said first shell, and said second axis being offset from said first axis to provide space within said first curved surface for said power mechanism.

2. A gun turret mounted in an opening in the nose or tail of an airplane which comprises an annular member secured within the airplane immediately adjacent the opening, a frame pivotally supported by the annular member for rotation about a vertical axis offset from the annular member in the direction of the opening, a turret generally spherical in shape formed with flat sides pivoted to the frame for rotation about a horizontal axis spaced from the vertical axis in the direction of the opening in order to extend a substantially hemispherical portion of the turret beyond the opening and thus increase the area over which the guns therein may be trained, and a curved shell fixed to the frame overlying the flat sides of the turret as well as portions of the upper and lower surfaces thereof, the shell being shaped to streamline the turret to the outer surface of the airplane.

3. A gun turret mounted in an opening in the nose or tail of an airplane so as to partially project therefrom which comprises an annular member secured in a vertical positon in the airplane immediately adjacent the opening, a frame pivotally supported by the annular member for rotation about a vertical axis offset from the annular member towards the opening, a turret generally spherical in shape formed with flat sides pivoted to the frame for rotation about a horizontal axis, and a curved shell fixed to the frame overlying the flat sides and a portion of the upper and lower surfaces of the turret for streamlining the turret to the outer surface of the airplane, the arrangement being such that the turret turns with respect to the shell when rotated about a horizontal axis but rotates with the shell when the frame is turned about the vertical axis.

4. A gun turret according to claim 2, in which the annular member is supported in substantially coaxial relation with the longitudinal axis of the airplane.

5. A gun turret according to claim 2, in which a pair of brackets are secured to the annular member at the top and bottom thereof respectively, the brackets projecting toward the opening for the turret, and pivot means for supporting the frame are mounted in the brackets.

6. A gun turret according to claim 2, further including a motor mounted upon the frame adjacent the horizontal turret axis for rotating the turret about its horizontal axis, the streamlining shell being shaped to form an enclosure for the motor and the frame.

DOUGLAS CLEGG.

REFERENCES CITED

The following references are of record in the file of this patent:

UNITED STATES PATENTS

| Number | Name | Date |
|---|---|---|
| 1,182,722 | Gavardie | Dec. 5, 1939 |
| 2,199,971 | Sanders | May 7, 1940 |
| 2,233,918 | Fey | Mar. 4, 1941 |
| 2,392,106 | Sutton | Jan. 1, 1946 |

FOREIGN PATENTS

| Number | Country | Date |
|---|---|---|
| 341,938 | Italy | July 16, 1936 |
| 515,993 | Great Britain | June 29, 1937 |
| 673,342 | France | Oct. 7, 1929 |
| 790,418 | France | Sept. 9, 1935 |
| 819,207 | France | July 5, 1937 |

OTHER REFERENCES

Life Magazine, page 66, April 6, 1942.
"Life" Magazine, page 66, "The Ball Turret," Jan. 24, 1944.
Aero Digest, page 121, Sept. 1943.
Aviation Magazine, page 201, Feb. 1945.

Certificate of Correction

Patent No. 2,501,662    March 28, 1950

DOUGLAS CLEGG

It is hereby certified that error appears in the printed specification of the above numbered patent requiring correction as follows:

Column 1, line 52, beginning with "Some" strike out all to and including the words and period "each other." in column 3, line 6;
and that the said Letters Patent should be read with this correction therein that the same may conform to the record of the case in the Patent Office.

Signed and sealed this 12th day of September, A. D. 1950.

[SEAL]

THOMAS F. MURPHY,
*Assistant Commissioner of Patents.*